(12) United States Patent
Johnson

(10) Patent No.: US 9,687,114 B2
(45) Date of Patent: Jun. 27, 2017

(54) ADJUSTABLE FOOD SUPPORT

(71) Applicant: Wet Puppy Products, LLC, Sandy Hook, CT (US)

(72) Inventor: Thomas A. Johnson, Sandy Hook, CT (US)

(73) Assignee: Wet Puppy Products, LLC, Sandy Hook, CT (US)

( * ) Notice: Subject to any disclaimer, the term of this patent is extended or adjusted under 35 U.S.C. 154(b) by 0 days.

(21) Appl. No.: 14/736,726

(22) Filed: Jun. 11, 2015

(65) Prior Publication Data
US 2016/0360930 A1    Dec. 15, 2016

(51) Int. Cl.
| | | |
|---|---|---|
| *A47J 47/00* | (2006.01) | |
| *A47J 43/18* | (2006.01) | |
| *B26B 29/06* | (2006.01) | |
| *A47J 37/06* | (2006.01) | |

(52) U.S. Cl.
CPC ........... *A47J 47/005* (2013.01); *B26B 29/063* (2013.01); *A47J 37/0694* (2013.01); *A47J 43/18* (2013.01)

(58) Field of Classification Search
CPC .. A47J 43/18; A47J 43/00; A47J 43/08; A47J 47/005; A47J 37/00; A47J 37/04; A47J 37/12; B26B 29/063; B25B 1/00; B25B 3/00; B25B 5/00; B23Q 1/00; B23Q 3/00
See application file for complete search history.

(56) References Cited

U.S. PATENT DOCUMENTS

| | | | |
|---|---|---|---|
| 345,528 A | 7/1886 | Mitchell | |
| 1,630,188 A | * 5/1927 | Knauff | A47J 37/0694 99/419 |
| 2,257,970 A | 10/1941 | Long | |
| 2,599,681 A | 6/1952 | Wells | |
| 2,861,729 A | 11/1958 | Gerson | |
| 2,942,639 A | 6/1960 | Margolis | |
| 3,596,354 A | 8/1971 | Emerson | |
| 3,995,844 A | 12/1976 | Hellman | |
| 4,140,340 A | 2/1979 | Cloutier | |
| D267,465 S | * 1/1983 | Hassett | D23/398 |
| 4,989,846 A | 2/1991 | Quinn | |
| 5,326,086 A | 7/1994 | Radencic | |
| 5,499,578 A | 3/1996 | Payne | |
| 5,580,037 A | 12/1996 | Gore | |
| 5,842,689 A | 12/1998 | Hunter | |

(Continued)

*Primary Examiner* — Monica Carter
*Assistant Examiner* — Seahee Yoon
(74) *Attorney, Agent, or Firm* — Daniel Pierron; Mark Malek; Widerman Malek, PL

(57) ABSTRACT

An adjustable food support includes a stabilizing member and a plurality of support members. Each support member may include two opposing intermediate sections, two opposing interfacing surfaces, and a connecting section. A longitudinal axis of each interfacing surface may be skew to a longitudinal axis of the opposing interfacing surface, defining an angle therebetween within the range from 60 degrees to 160 degrees. A first support member plane may be defined by the longitudinal axes of the opposing interfacing surfaces of a support member. The first support member plane of one support member may be positionable so as to be generally parallel to the first support member plane of another support member of the plurality of support members.

12 Claims, 12 Drawing Sheets

(56) References Cited

U.S. PATENT DOCUMENTS

| | | | |
|---|---|---|---|
| 6,206,356 B1* | 3/2001 | Beloff | A47J 47/005 269/289 R |
| 6,364,277 B1* | 4/2002 | Miller | B23Q 3/1546 248/676 |
| 6,386,096 B1 | 5/2002 | Tiemann | |
| 6,422,525 B1 | 7/2002 | McAdam et al. | |
| 7,003,913 B1 | 2/2006 | Smith | |
| D543,802 S | 6/2007 | Fuchs | |
| D591,568 S | 5/2009 | Grabowski | |
| 7,735,816 B2 | 6/2010 | Hashim | |
| 7,874,549 B2 | 1/2011 | DiNatale | |
| 8,156,861 B1 | 4/2012 | Prokopow | |
| 8,272,631 B2 | 9/2012 | Gannon | |
| 8,317,176 B2 | 11/2012 | Ferone | |
| 8,511,295 B2* | 8/2013 | Buerkle | F23H 17/08 126/152 B |
| 8,740,210 B2 | 6/2014 | Fiala | |
| 8,857,802 B1 | 10/2014 | Geier | |
| 8,899,566 B2 | 12/2014 | Drummond | |
| 2003/0056656 A1 | 3/2003 | Marco, Jr. | |
| 2006/0027515 A1 | 2/2006 | Tomas Martinez et al. | |
| 2014/0252193 A1 | 9/2014 | Creech et al. | |
| 2015/0000109 A1* | 1/2015 | Plank | B23Q 3/104 29/557 |

* cited by examiner

ADJUSTABLE FOOD SUPPORT

FIELD OF THE INVENTION

The present invention relates to systems for providing adjustable support for food items when cutting.

BACKGROUND

The slicing of food items, particularly those that are relatively large and prone to rolling, such as watermelons, other melons, gourds, and the like, has long been a challenge in food preparation. While systems for supporting such food items have previously been offered, such systems typically suffered from one of several shortcomings. First, the system may have supported the food item in an orientation that is not conducive to slicing. Second, the system may have necessarily included a slicing device, such as a blade, in order to effectively utilize the support of the food item. This is undesirable due to an increased cost of the system, as well as maintenance of a separate single-purpose blade. Third, the system may have been generally non-adjustable thus substantially limiting the range of sizes of food items that may be supported thereby, either being limited to food items that are relatively small or relatively large. Additionally, as such non-adjustable systems are typically permanently kept in a configuration for slicing, such configurations are typically not conducive to storing the system. As such, an inordinate amount of storage space would have to be dedicated to storing the system. Fourth, the system may include a method of supporting the food item that significantly limits an ability of the user to slice the food item in a variety of cutting planes, constraining the user to a number of predetermined cutting planes that may be different from the desires of the user.

One or more of these shortcomings have typically been embodied in previous solutions for supporting food items for slicing. Accordingly, there is a need in the art for an adjustable food support that may address one or more of these issues.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an adjustable food support comprising a stabilizing member and a plurality of support members. One or more of the support members may comprise two opposing intermediate sections, two opposing interfacing surfaces, each being located at an upper section of a respective intermediate section, and a connecting section connecting at least one of the intermediate sections and the interfacing surfaces. A longitudinal axis of each interfacing surface may be skew to a longitudinal axis of the opposing interfacing surface, defining an angle therebetween within the range from 60 degrees to 160 degrees. Furthermore, a support member plane may be defined by the longitudinal axes of the opposing interfacing surfaces of a support member. Additionally, the support member plane of one support member of the plurality of support members may be positionable so as to be generally parallel to the support member plane of another support member of the plurality of support members.

In some embodiments, the stabilizing member may be configured to extend from the connecting section of the support member. Furthermore, the stabilizing member may be a base member comprising a lower section and a support receiving section. At least one of the connecting section and the intermediate section may be configured to be removably attachable to the support receiving section. Additionally, each interfacing surface may comprise a lower section, and a blade clearance may be defined between the lower sections of opposing interfacing surfaces. The blade clearance may be within the range from ⅛ inch to 4 inches.

In some embodiments, the base member may be configured to permit a support member of the plurality of support members to be attached thereto in a first configuration such that the adjustable food support has a first height and in a second configuration such that the adjustable food support has a second height. The first height may be greater than the second height.

Furthermore, the base member may also comprise a storage receiving section. The support member may be attached to the support receiving section in the first configuration. Additionally, the support member may be attached to the storage receiving section in the second configuration. The connecting section may be configured to be attachable to the support receiving section in the first configuration comprising a first orientation such that the intermediate section extends generally upward from the lower section and is attachable to the support receiving section in the second configuration comprising a second orientation such that the intermediate section extends generally parallel to a plane defined by the lower section.

In some embodiments, the support receiving section may comprise a plurality of recesses formed in an upper surface of the lower section. Additionally, the connecting section may further comprise an extension member extending generally downward from a lower surface of the connecting section. The extension member may be configured to engage with a recess of the plurality of recesses to prevent relative lateral movement therebetween.

The connecting sections may define a longitudinal axis that is parallel to a plane defined by the lower section of the base member. The base member may be configured to permit at least two support members of the plurality of support members to be attached thereto simultaneously such that the longitudinal axes of the connecting sections of the attached support members are parallel. Furthermore, simultaneous attachment of two support members to the base member may define a separation distance therebetween. The base member may be configured to permit the support members to be attached thereto so as to define a separation distance of at least 1 inch.

The base member may further comprise an edge section extending upwardly from the lower section about the periphery of the lower section. The support receiving section may comprise a plurality of retaining members extending upwardly from the lower section and inwardly from the edge section. Additionally, the connecting section may be configured to be positioned between adjacent retaining members so as to removably attach the support member to the base member.

In some embodiments, a lower end of the interfacing surfaces of a first support member of the plurality of support members may be at a first distance above the stabilizing member. Furthermore, a lower end of the interfacing surfaces of a second support member of the plurality of support members may be at a second distance above the stabilizing member. The first distance may be greater than the second distance.

The plurality of support members may comprise a first support member and a second support member. Each of the first and second support members may include first intermediate sections and first interfacing surfaces proximate to a first end of the connecting section thereof and second intermediate sections and second interfacing surfaces proximate to a second end of the connecting section thereof. The first interfacing surfaces of each of the first and second support members may be positionable to define a first plane, and the second interfacing surfaces of each of the first and second support members are positionable to define a second plane. The first plane and the second plane may intersect. Furthermore, the interfacing surfaces of at least one support member of the plurality of support members are coplanar. Additionally, the intermediate sections may further comprise a rotation member configured to permit the interfacing surfaces to be rotated relative to the respective intermediate sections.

DETAILED DESCRIPTION OF THE INVENTION

Figure 1:
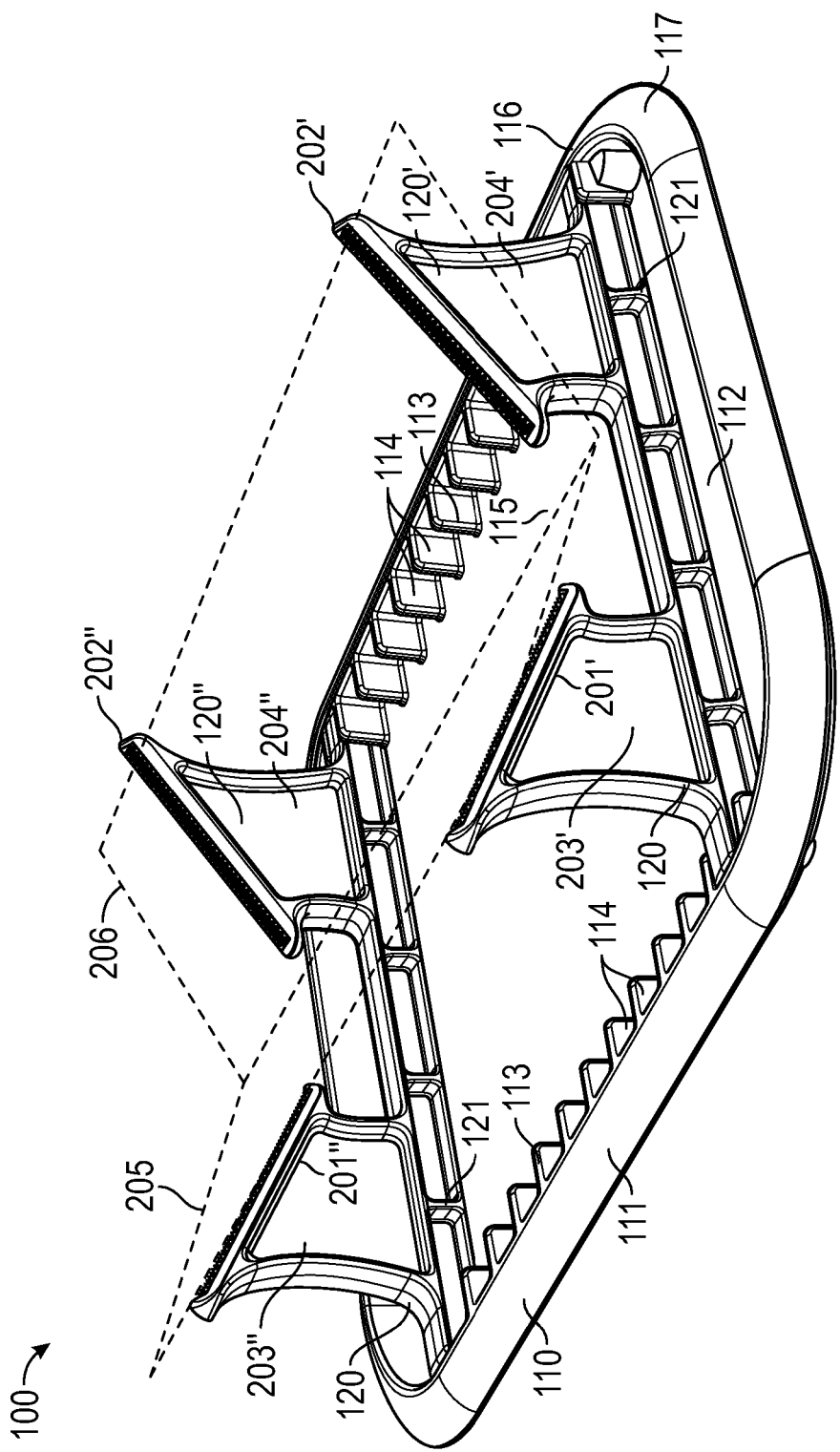
FIG. 1 is a perspective view of an adjustable food support according to an embodiment of the invention.
Figure 2:
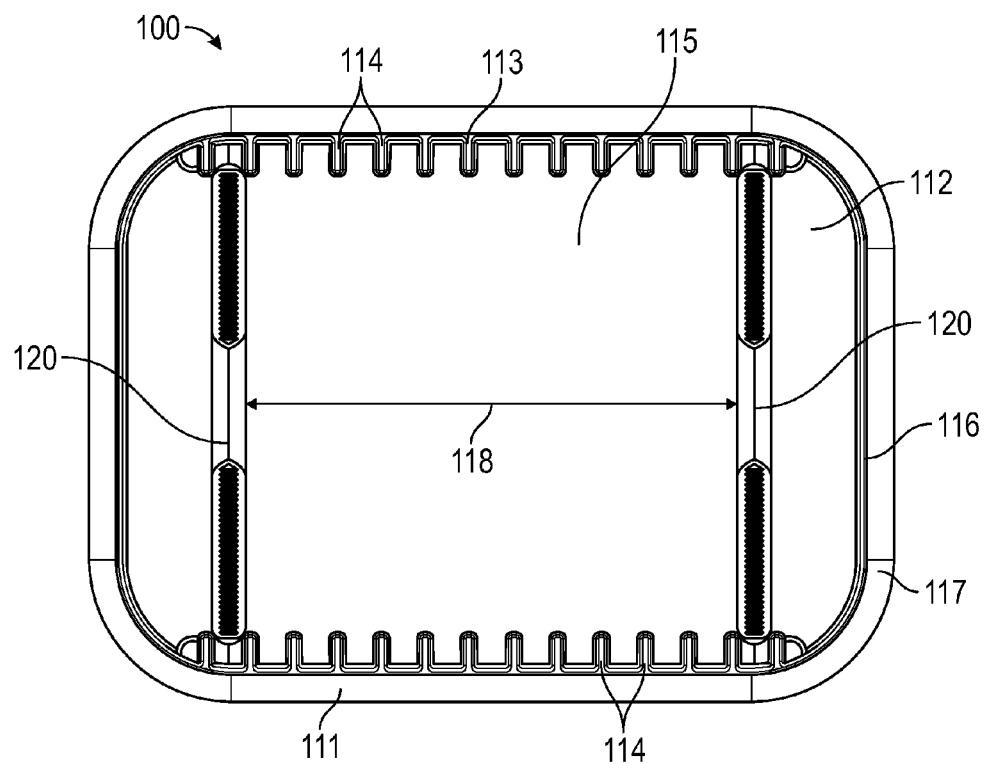
FIG. 2 is a top view of the adjustable food support of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a food support apparatus configured to support a food item, such as a melon or any ovoid foodstuff, in such a way as to facilitate the slicing thereof. More specifically, the food support apparatus may support a food item in an orientation that facilitates the use of a knife to cut the food items into multiple pieces, along various cutting planes, and at various cutting angles. Additionally, the food support apparatus may be adjustable so as to accommodate food items of varying sizes and geometries.

Referring now to FIGS. 1-6, an adjustable food support 100 is presented. The adjustable food support 100 may include a stabilizing member 110 and a plurality of support members 120. The stabilizing member 110 and the plurality of support members 120 may be configured to cooperate with one another so as to provide stable support for a food item. More specifically, the stabilizing member 110 may be configured to provide lateral support to the plurality of support members 120 so as to prevent the tipping over of the plurality of support members 120 when a food item is supported thereby.

In the embodiment illustrated in FIG. 1, for example, the stabilizing member 110 illustratively includes a base member 111. The base member 111 may be configured to permit the plurality of support members 120 to be removably attached thereto. The attachment of the plurality of support members 120 to the base member 111 may prevent the relative movement between each support member 120 and the base member 111 and between respective support members 120.

The base member 111 may have any geometric configuration that may facilitate the support of a food item in the cutting thereof. In the embodiment illustrated in FIGS. 1-6, the base member 111 illustratively has a generally rectangular configuration with rounded corners. Other geometric configuration of the base member 111 are contemplated and included within the scope of the invention, including, but not limited to, squares, circles, ellipses, ovals, triangles, and any other polygons, including regular polygons, as are known.

In some embodiments, the base member 111 may comprise a lower section 112 and a support receiving section 113. The support receiving section 113 may be configured to permit the plurality of support members 120 to be removably attached to the base member 111. Any means or method of attachment between the plurality of support members 120 and the support receiving section 113 as may be known in the art is contemplated and included within the scope of the invention. The support receiving section 113 may include a plurality of retaining members 114. The plurality of retaining members 114 may extend generally upward from an upper surface 115 of the lower section 112. Additionally, the base member 111 may further comprise an edge section 116. The edge section 116 may extend generally upward from the lower section 112 about a periphery of the lower section 112. Additionally, the plurality of retaining members 114 may extend generally inwardly from the edge section 116. Furthermore, the edge section 116 may include a lip portion 117 extending generally outwardly from an upper end of the edge section 160. The edge section 116 may be configured to facilitate the gripping of the adjustable food support 110 by a user.

The plurality of retaining members 114 may be distributed in any pattern so as to facilitate the attachment of the plurality of support members 120 to the base member 111. The plurality of retaining members 114 are spaced apart so as to permit a portion of a support member 120 to be positioned therebetween and removably attached as a result of its positioning between adjacent retaining members 114. Additionally, the plurality of retaining members 114 may be distributed on opposing sides of the base member 111 such that each retaining member 114 has an opposing retaining member 114 on the opposite side of the base member 111.

Each pair of opposing retaining members 114 may be generally coplanar, such that when a support member 120 is positioned between adjacent retaining members 114 on one side of the base member 111, the support member 120 may be similarly positioned between the opposing pair of adjacent retaining members 114 on the opposite side of the base member 111, thereby enabling the support member 120 to be attached to the base member 111. Such attachment at two ends of the support member 120 may provide increased resistance to lateral movement of the support member 120 relative to the base member 111, while also preventing the support member 120 from tipping over. Furthermore, the selective positioning of support members 120 between differing pairs of adjacent retaining members 114 may enable a user to adjust the adjustable food support 100 so as to support food items of varying sizes.

Figure 3:
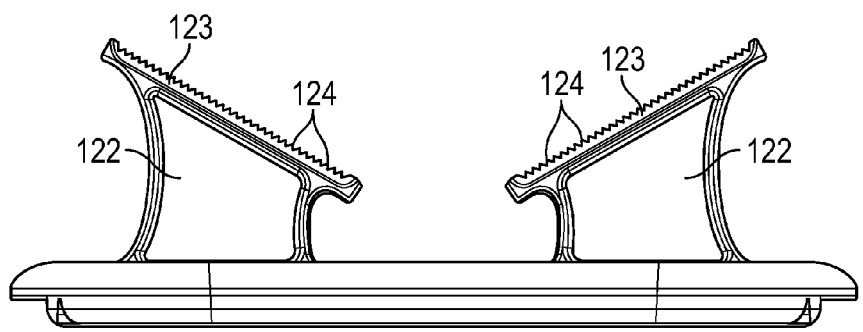
FIG. 3 is a side elevation view of the adjustable food support of FIG. 1.
Figure 4:
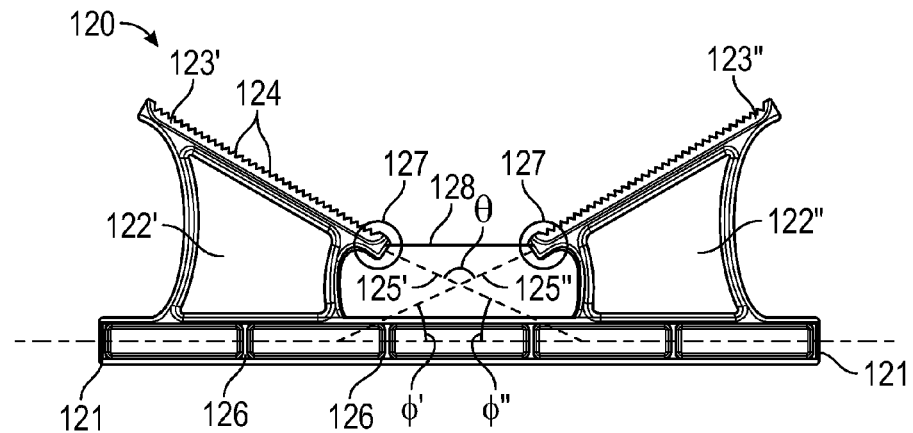
FIG. 4 is a side elevation view of a support member of the adjustable food support of FIG. 1.

Referring now specifically to FIGS. 3-4, the support members 120 will now be discussed in greater detail. Each support member 120 of the plurality of support members 120 may comprise a connecting section 121, a plurality of intermediate sections 122, and a plurality of interfacing surfaces 123. The connecting section 121 may be configured to connect at least one of the intermediate sections 122 and the interfacing surfaces 123. Furthermore, the connecting section 121 may be integrally formed with the intermediate sections 122 or the interfacing surfaces 123. In the present embodiment, the connecting section 121 connects to the opposing intermediate sections 122 at a lower end thereof. Additionally, the connecting section 121 may be configured to provide sufficient support to each of the intermediate sections 122 so as to resist the buckling of the support member 121 under load from a food item. In the present embodiment, the connecting section 121 comprises a plurality of ribs 126 spaced apart along the length of the connecting section 121 to increase the strength of the connecting section 121.

The interfacing surfaces 123 may be located at an upper section of an associated intermediate section 122. Accordingly, each intermediate section 122 may be configured so as to facilitate the attachment of an associated interfacing surface 123 thereto, where the associated interfacing surface 123 is fabricated separately from the intermediate section 122, as in the present embodiment. In some embodiments, the interfacing surface 123 may be integrally formed with the intermediate section 122. Furthermore, the interfacing surfaces 123 may include a plurality of features 124. The plurality of features 124 may be configured to facilitate the interfacing with a food item so as to prevent or generally preclude the relative motion of the food item to the interfacing surface 123. Any type of feature that may accomplish the prevention of such motion is contemplated and included within the scope of the invention, including, but not limited to, grooves, teeth, use of sticky or non-skid material, and the like. In some embodiments, the plurality of features 124 may be configured so as to not cause physical deformation of a food item when a food item is interfaced therewith.

In some embodiments, the intermediate sections 122 and the interfacing surfaces 123 may be configured such that the interfacing surfaces 123 of a single support member 120 are generally coplanar. More specifically, the longitudinal axes of the opposing interfacing surfaces 123 may be generally coplanar. Additionally, in some embodiments, the longitudinal axes of the interfacing services 123 may be generally coplanar with the longitudinal axis of the connecting section 121. In some embodiments, the interfacing surfaces 123 may be non-coplanar, and/or may be non-coplanar with the longitudinal axis of the connecting section 121.

Where, as in the present embodiment, each support member 120 comprises a pair of opposing intermediate sections 122', 122" and a pair of opposing interfacing surfaces 123', 123" each interfacing surface 123', 123" may define respective longitudinal axes 125', 125". The longitudinal axes 125', 125" of each interfacing surface 123', 123" may be skew to one another. Furthermore, the intersection of the longitudinal axes 125', 125" may define an angle $\theta$. The angle $\theta$ may be within the range from 60° to 160°. In the present embodiment, the angle $\theta$ is 120°. The angle $\theta$ may be controlled in manufacturing by adjusting the height and positioning of the constituent parts of the support members 120, specifically, the intermediate sections 122 and the interfacing surfaces 123.

In some embodiments, each of the longitudinal axes 125', 125" may intersect with a longitudinal axis 126 of the connecting section 121 to form respective angles φ', φ". In some embodiments, angle φ' may be equal to angle φ". In other embodiments, they may be unequal. Furthermore, each angle φ', φ" may be within the range from 10° to 60°.

Referring now specifically to FIG. 4, the interfacing surfaces 123 may each include a lower section 127. The lower sections 127 of opposing interfacing surfaces 123 may define a gap therebetween, defined as a blade clearance 128. The blade clearance 128 may be of sufficient width so as to permit a cutting device, such as a blade, to pass between the lower sections 127. In some embodiments, the blade clearance 128 may be within the range from ⅛ inch to 4 inches.

Referring now back to FIG. 1, additional aspects of this embodiment of the present invention will be discussed. In some embodiments, it is advantageous for an interfacing surface of one support member to cooperate with an interfacing surface of another support member so as to define a plane. Such a definition of a plane may create a predictable support point that a user may intuitively understand when positioning a food item on an adjustable food support. In the present embodiment, the plurality of support members 120 may comprise a first support member 120' and a second support member 120", each comprising first interfacing surfaces 201', 201", second interfacing surfaces 202', 202", first intermediate sections 203', 203", and second intermediate sections 204', 204", respectively. The first intermediate sections 203', 203" may be positioned generally proximate to a first end of the connecting section 121 of the respective first and second support members 120', 120", and the second intermediate sections 204', 204" may be positioned generally proximate to a second end of the connecting section 121 of the respective first and second support members 120', 120". Furthermore, the first interfacing surfaces 201', 201" may be positionable so as to define a first plane 205. The first plane 205 may be defined as the plane that is coplanar with a plane defined by each of the first interfacing surfaces 201', 201" and/or is defined by coplanar longitudinal axes of the first interfacing surfaces 201', 201". Similarly, the second interfacing surfaces 202', 202" may be positionable so as to define a second plane 206, which may be defined as the plane that is coplanar with a plane defined by each of the second interfacing surfaces 202', 202" and/or is defined by coplanar longitudinal axes of the second interfacing surfaces 202', 202". Additionally, the first plane 205 and the second plane 206 may intersect. In some embodiments, the first and second plane 205, 206 may intersect at a location above the lower section 112. In some embodiments, the first and second planes 205, 206 may intersect at a location below the lower section 112. Although a pair of support members 120 are illustrated in the appended drawings, those skilled in the art will appreciate that any number of support members may be provided while still accomplishing the goals, features and objectives according to the present invention.

Figure 5:
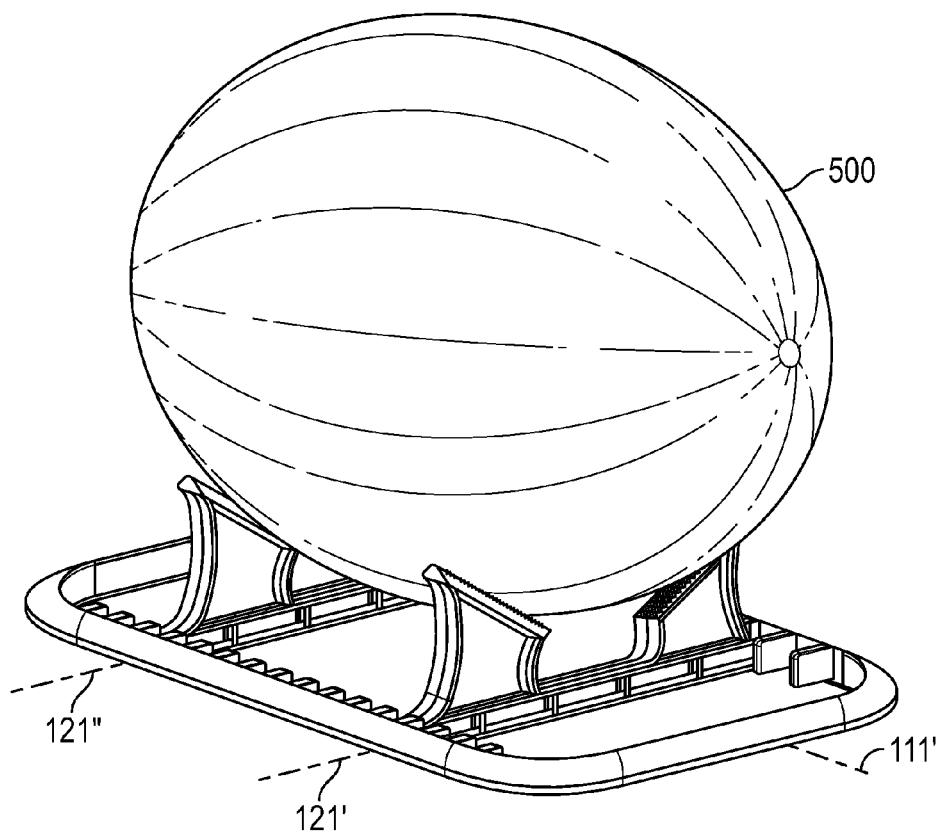
FIG. 5 is an environmental perspective view of the adjustable food support of FIG. 1 supporting a food item.

Referring now additionally to FIG. 5, additional aspects of the connection between the connecting section 121 of the support members 120 and the base member 111 will be discussed in greater detail. The base member 111 may be configured to permit the plurality of support members 120 to be removably attached thereto such that the support members 120 are generally parallel to one another. More specifically, the base member 111 may be configured so as to permit the support members 120 to be removably attached thereto such that longitudinal axes 121', 121" of the connecting sections 121 of the support members 120 are generally parallel to one another. The interfacing surfaces 123 of each support member 120 may define a support member plane. Each support member 120 may be positionable such that the support member plane defined thereby is generally parallel to the support member plane of another support member 120 of the plurality of support members 120. Additionally, each of the longitudinal axes 121', 121" may further be generally perpendicular to a longitudinal axis 111' of the base member 111. It is further contemplated and included within the scope of the invention that only one of the longitudinal axes 121', 121" may be perpendicular to the longitudinal axis 111' of the base member 111.

Where two or more support members 120 are simultaneously attached to the base member 111, they may define therebetween a separation distance 118. The separation distance 118 may be configured so as to enable the removable attachment of the support members 120 to the base member 111 at distances that are facilitative to the support of a food item 500 (illustrated in FIG. 5). In the present embodiment, the separation distance 118 may be at least one inch. Other separation distances are contemplated included in the scope of the invention, and are merely a function of the links of the base member 111 in the configuration of the support receiving section 113, where applicable. The adjustment of the separation distance 118 may enable a user to support food items of differing sizes. Relatively smaller food items may be supported by establishing a relatively smaller separation distance, and relatively larger food items may be supported by establishing a relatively greater separation distance.

Referring now to FIGS. 1-6, additional aspects of the attachment between the base member 111 and the support members 120 will be discussed. The stabilizing member 110 may be configured to permit the plurality of support members 120 to be attached thereto in two configurations. When attached in the first configuration, the plurality of support members 120 may be oriented so as to support a food item, defining a first height of the adjustable food support 100. When attached in the second configuration, the plurality of support members 120 may be oriented so as to facilitate storage of the adjustable food support 100, thereby defining a second height of the adjustable food support 100 that is less than the first height. Any means or method as is known in the art to permit the attachment of the plurality of support members 120 in the first and second configurations is contemplated and included within the scope of the invention.

Figure 6:
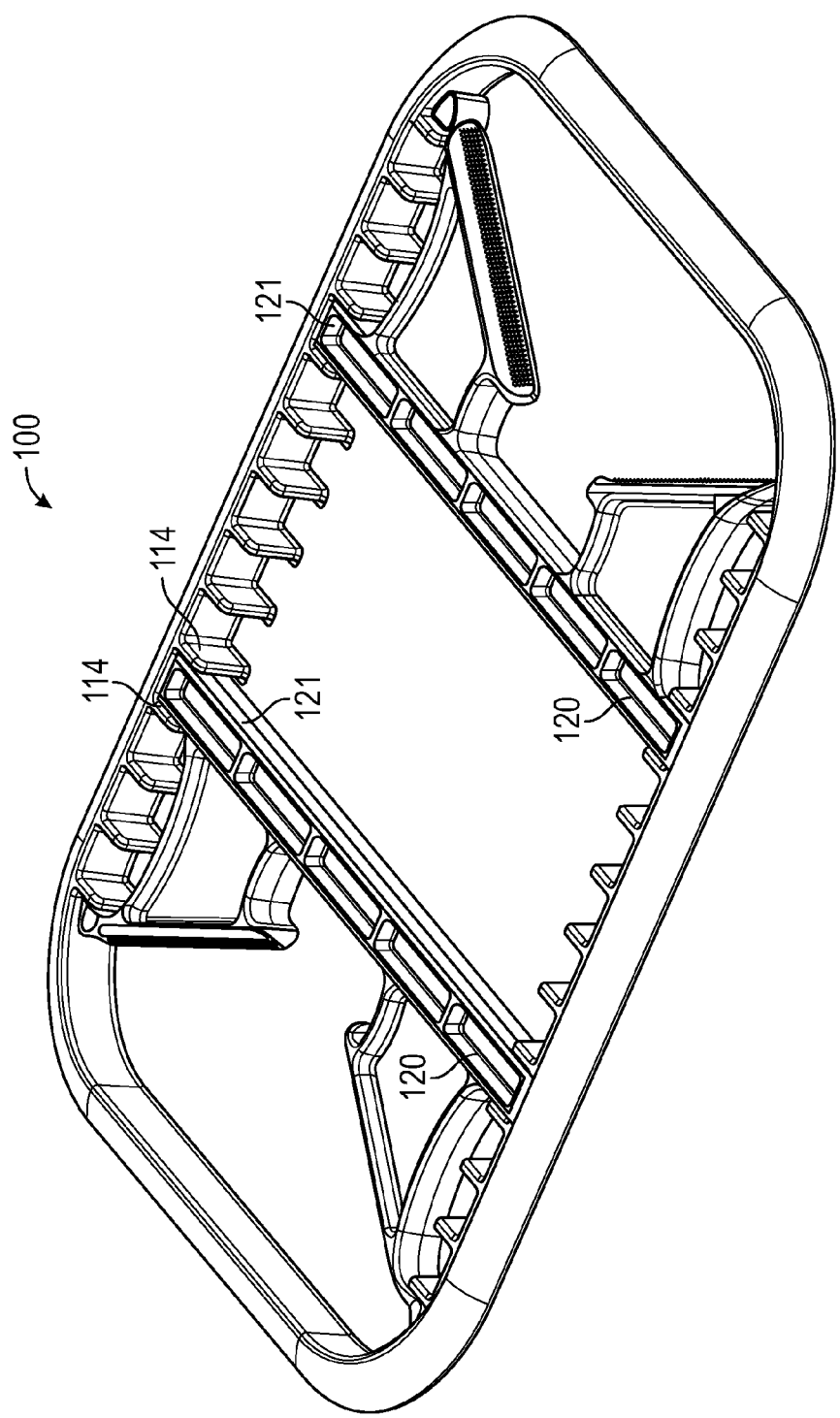
FIG. 6 is a perspective view of the adjustable food support of FIG. 1 including two support members in a storage configuration.

In the present embodiment, the connecting section 121 of each of the support members 120 may be configured so as to be attached in a first configuration, as shown in FIGS. 1-5, such that the intermediate section 122 extends generally upward from the lower section 112, and in a second configuration, as shown in FIG. 6, such that the intermediate section 122 extends generally parallel to a plane defined by the lower section 112. Such attachment in first and second configurations is enabled by the connecting sections 121 being configured to be removably attachable between adjacent retaining members 114 in a first orientation shown in FIGS. 1-5, thereby defining the first configuration, and in a second orientation shown in FIG. 6, thereby defining the second configuration. As such, a height of the connecting section 121 may be approximately equal to a depth thereof, in order to be placed between adjacent retaining members 114 of a fixed distance apart.

Figure 7:
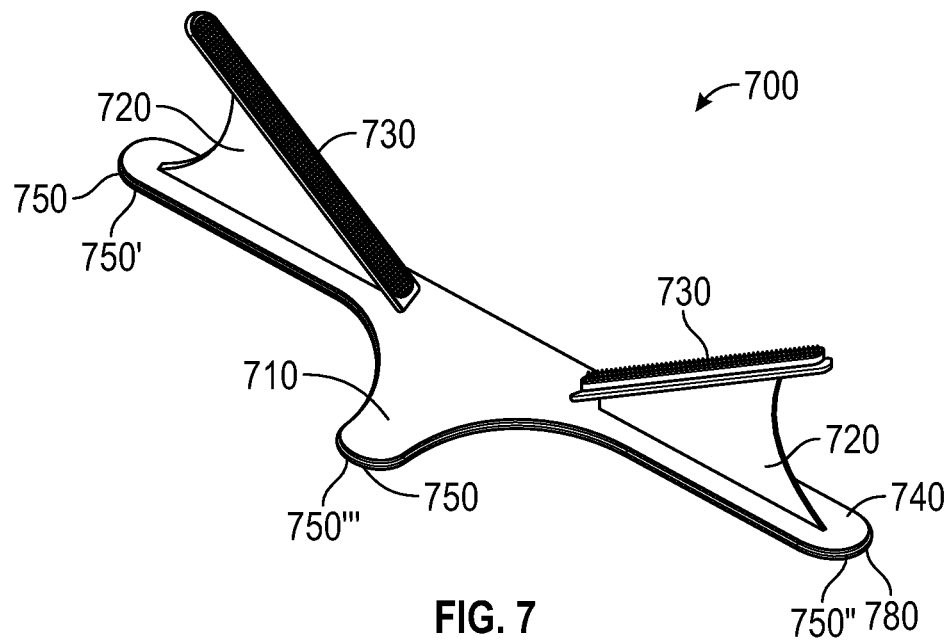
FIG. 7 is a perspective view of an adjustable food support according to an embodiment of the invention.

Referring now to FIG. 7, a support member 700 of an adjustable food support according to an alternative embodiment of the invention is presented. In the present embodiment, the support member 700 comprises a stabilizing member 710 that is integrally formed therewith. Accordingly, the adjustable food support may comprise a plurality of support members 700, each support member 700 including an integrally formed stabilizing member 710. Furthermore, each support member 700 may comprise two opposing intermediate sections 720, two opposing interfacing surfaces 730, and a connecting section 740. In the present embodiment, the connecting section 740 may connect the opposing intermediate sections 720. Furthermore, the connecting section 740 may be integrally formed with the intermediate section 720.

As previously recited, the stabilizing member 710 may be integrally formed with the support member 700. In the present embodiment, the stabilizing member 710 extends to one side of the connecting section 740. Furthermore, the stabilizing member 710 comprises a single extending section, extending from approximately the middle of one side of the connecting section 740. It is contemplated included within the scope of the invention that the stabilizing member 710 may extend from any portion of the connecting section 740, and may comprise any number of extending sections. Additionally, the stabilizing member 710 may be configured to extend outwardly from the connecting section 740 to a sufficient distance so as to prevent tipping of the support member 700 in the direction of the stabilizing member 710.

In the present embodiment, the support member 700 comprises a plurality of feet 750. The feet 750 may be distributed about a lower surface of the support member 700. In the present embodiment, first and second feet 750', 750" are located at opposite ends of the connecting section 740, and a third foot 750''' is located at an end of the stabilizing member 710. Any number of feet 750 arranged in any distribution is contemplated and intended to be included within the scope of the invention. Additionally, the feet 750 may be configured to facilitate the prevention of movement of the support member 700 relative to a surface the support member 700 is positioned upon. Accordingly, the feet 750 may be formed of a material so as to prevent sliding, such as an anti-skid material, and may include structural features to similarly prevent sliding.

Figure 9:
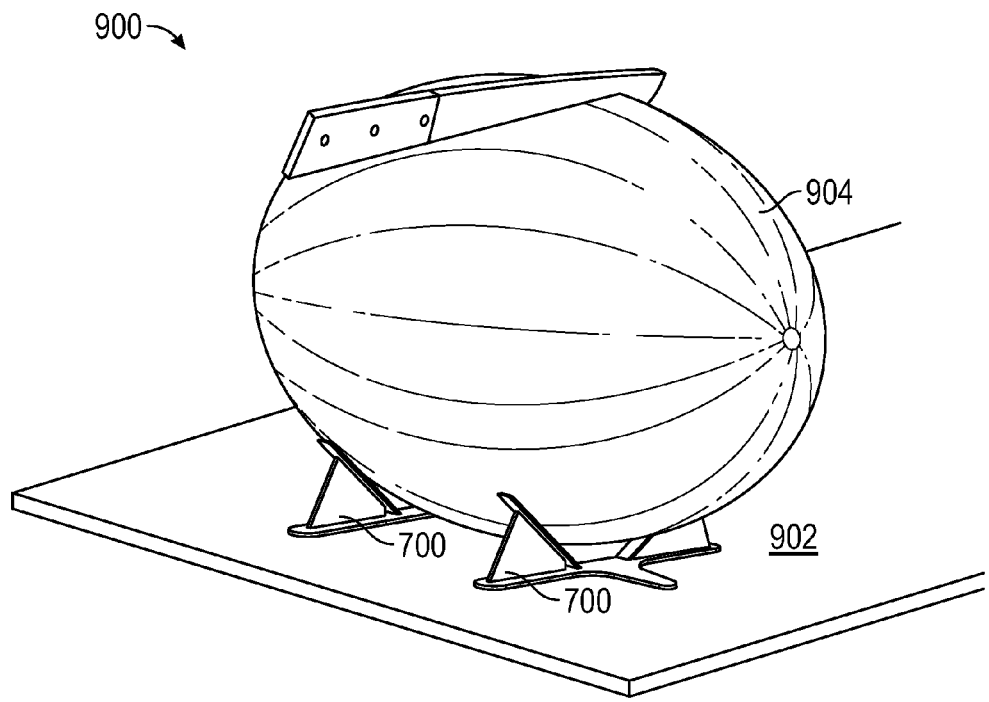
FIG. 9 is a perspective view of a plurality of the support members of FIG. 7 supporting a food item.

A pair of support members 700 according to the present embodiment is shown in the adjustable food support 900 of FIG. 9. The support members 700 may be spaced apart on a surface 902 so as to support a food item 904 above the surface 902 while preventing motion of the food item 904 relative to the surface 902 to facilitate cutting of the food item 904. Additionally, the low profile of the support members 700 provides significant freedom in slicing the food item 904 at a multitude of angles and through various cutting planes.

Figure 8:
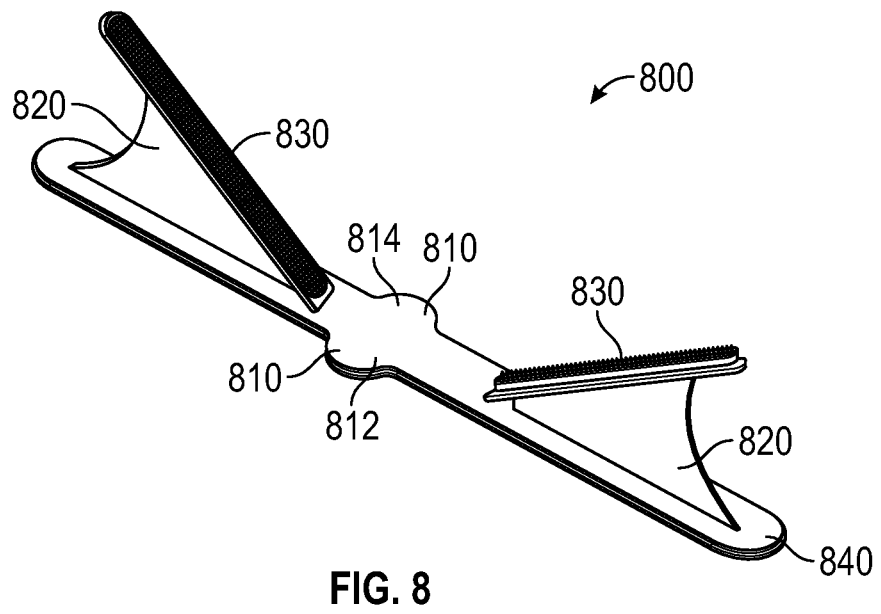
FIG. 8 is a perspective view of an adjustable food support according to an embodiment of the invention.

Referring now to FIG. 8, a support member 800 of an adjustable food support according to an embodiment of the invention is presented. In the present embodiment, the support member 800 comprises a stabilizing member 810 that is integrally formed therewith. Accordingly, the adjustable food support may comprise a plurality of support members 800, each support member 800 including an integrally formed stabilizing member 810. Furthermore, each support member 800 may comprise two opposing intermediate sections 820, two opposing interfacing surfaces 830, and a connecting section 840. The present embodiment, the connecting section 840 may connect the opposing intermediate sections 820. Furthermore, the connecting section 840 may be integrally formed with the intermediate section 820.

The stabilizing member 810 may comprise a first extending section 812 and a second extending section 814. The first extending section 812 may extend from a first side of the connecting section 840, and the second extending section 814 may extend from a second side of the connecting section 840. The first and second sides of the connecting section 840 that the stabilizing member 810 extends from may be generally opposite one another. In other embodiments, the first and second sides may have an alternative relationship to one another.

Each of the first and second extending sections 812, 814 may extend from the connecting section 840 so as to prevent or generally preclude tipping of the support member 800 in their respective directions. Each of the first and second extending sections 812, 814 may extend from the connecting section 840 from any point of the connecting section 840. In the present embodiment, each of the first and second extending sections 812, 814 extend from approximately the middle along the length of the connecting section 840. It is contemplated and included within the scope of the invention that the first and second extending sections 812, 814 may extend from opposing sections of the connecting section 840 so as to be generally aligned, or they may extend from differing sections of the connecting section 840, such that they are generally nonaligned. Additionally, the first and second extending sections 812, 814 may extend approximately the same distance from the connecting section 840, or they may extend different distances. Additionally, the distance each of the first and second extending sections 812, 814 may be greater than, less than, or approximately equal to the distance the stabilizing member 710 extends from the connecting section 740 in the embodiment depicted in FIG. 7.

In some embodiments, an adjustable food support may comprise one or more support members 800 as depicted in FIG. 8, and one or more support members 700 as depicted in FIG. 7.

Figure 10:
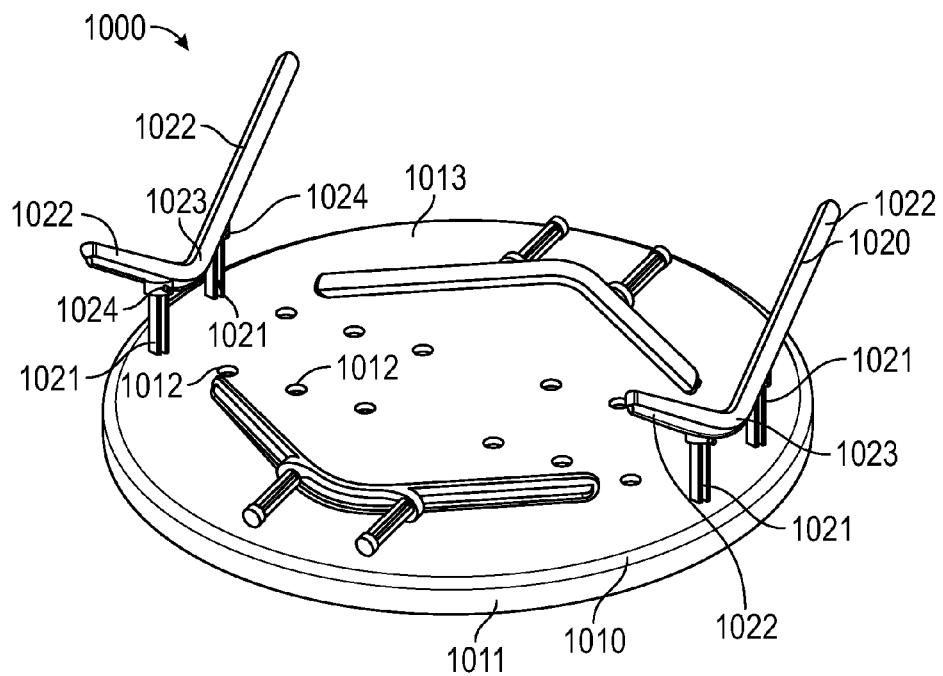
FIG. 10 is a perspective view of an adjustable food support according to an embodiment of the invention.

Referring now to FIG. 10, an adjustable food support 1000 according to another embodiment of the invention is presented. The adjustable food support 1000 may comprise a stabilizing member 1010, being a base member 1011 having a support receiving section in the form of a plurality of recesses 1012 formed in an upper surface 1013 of the base member 1011. The plurality of recesses 1012 may be configured to have any geometric configuration as is known in the art, including, but not limited to, circles, squares, I-shapes, H-shapes, and the like.

Additionally, the adjustable food support 1000 may further comprise a plurality of support members 1020. Each support member 1020 may include opposing intermediate sections 1021, opposing interfacing surfaces 1022 extending from associated intermediate sections 1021, and a connecting section 1023 connected to the interfacing surfaces 1022. In the present embodiment, the connecting section 1023 is integrally formed with the interfacing surfaces 1022.

The plurality of recesses 1012 may be configured to permit the intermediate sections 1021 of the support members 1020 to be positioned therewithin, thereby removably attaching the support member 1020 to the base member 1011. Furthermore, the plurality of recesses 1012 may be grouped into pairs that are offset from one another at a distance that equals the distance the opposing intermediate sections 1021 are offset from one another. Each pair of recesses 1012 may be separated from adjacent pairs of recesses 1012 by an amount equal to the separation distance as recited hereinabove. Additionally, the pairs of recesses 1012 may be distributed about the upper surface 1013 of the base member 1011 in any manner. In the illustrated embodiments, the plurality of recesses 1012 generally forms two parallel lines. Furthermore, any number of recesses 1012 may be comprised.

Additionally, the support members 1020 may comprise one or more extension sections 1024. The extension section 1024 may be configured to cooperate with a structure of the base member 1011 so as to removably attach the support member 1020 to the base member 1011 in a second configuration, as described hereinabove. In the illustrated embodiment, the extension section 1024 may be an outcropping extending from the intermediate section 1021. Additionally, the extension section 1024 may be configured to be positioned within the plurality of recesses 1012. Additionally, in some embodiments, the base member 1011 may further comprise storage recesses (not shown) configured to permit the extension section 1024 to be positioned therewithin. Furthermore, in such embodiments, the storage recesses may be positioned so as to permit the support members 1020 to be attached thereto and not extend beyond the periphery of the base member 1011.

Figure 11:
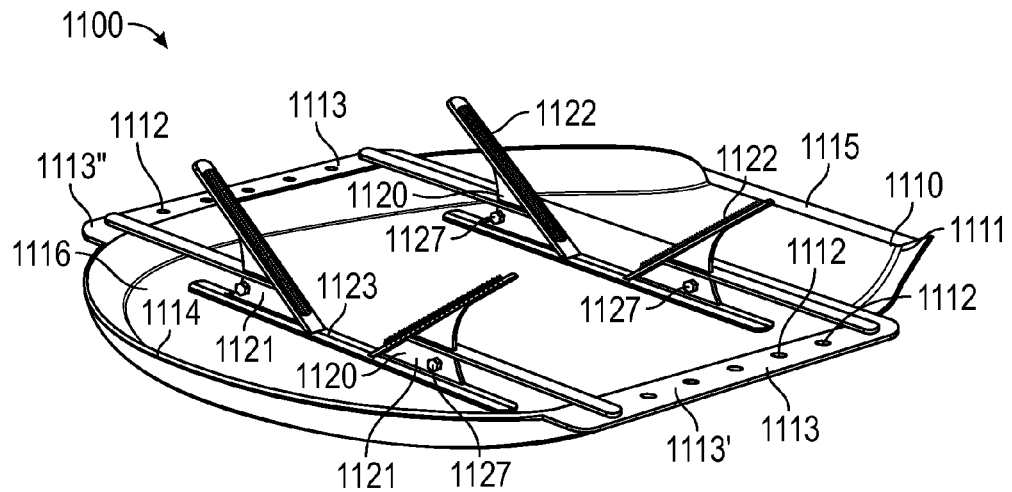
FIG. 11 is a perspective view of an adjustable food support according to an embodiment of the invention.
Figure 12:
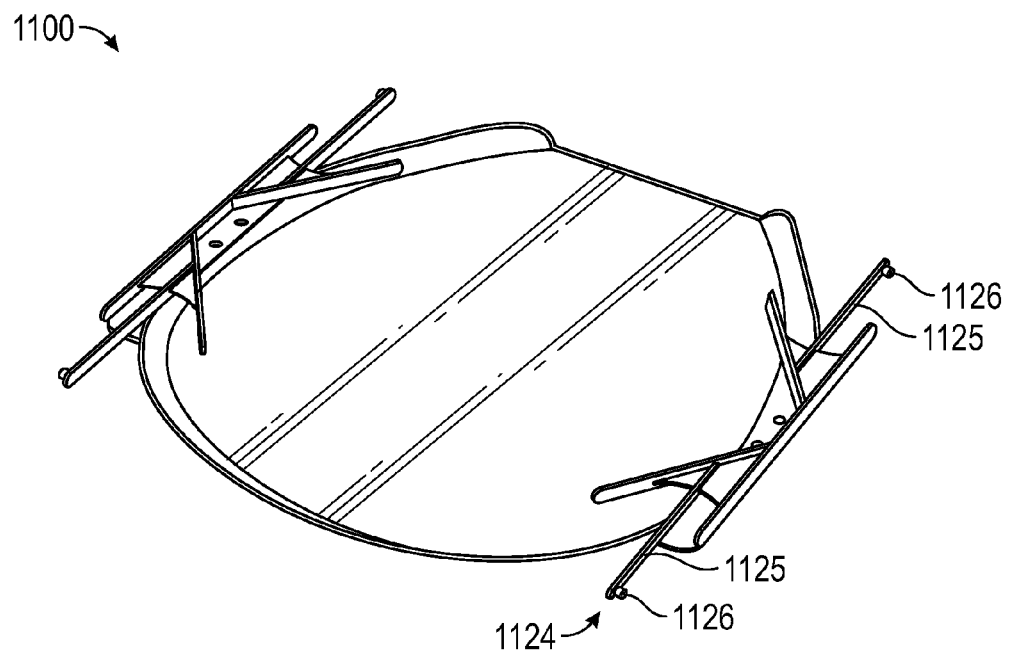
FIG. 12 is a perspective view of the adjustable food support of FIG. 11 including two support members in a storage attachment configuration.

Referring now to FIGS. 11-12, an adjustable food support 1100 according to another embodiment of the invention is presented. The adjustable food support 1100 may comprise a stabilizing member 1110 in the form of a base member 1111 comprising a support receiving section in the form of a plurality of recesses 1112 formed in one or more ridges 1113 extending from a wall 1114 formed substantially about the periphery of the base member 1111. The plurality of recesses 1112 may be formed such that each recess formed in a first ridge 1113' may be generally opposite another recess formed in a second ridge 1113", defining pairs of recesses 1112. The base member 1111 may further include a gap 1115 in the wall 1114 so as to facilitate the pouring of liquid and solid material collected by the base member 1111 during cutting of a food item.

Additionally, the adjustable food support 1100 may comprise a plurality of support members 1120 comprising opposing intermediate sections 1121, opposing interfacing surfaces 1122, and a connecting section 1123 attached to the intermediate sections 1121. Furthermore, the support members 1120 may further comprise attachment members 1124 comprising an extension section 1125 attached to and extending outwardly from the intermediate section 1121. The attachment members 1124 may further comprise an attachment section 1126 configured to cooperate with a structure of the stabilizing member 1111 so as to removably attach the support member 1120 thereto. Specifically, the attachment section 1126 may be an outcropping extending from a surface of the extension section 1125 that is configured to be positioned within one of the plurality of recesses 1112. Furthermore, each support member 1120 may comprise a pair of attachment members 1124 that are configured to include attachment sections 1126 that cooperate with a pair of recesses 1112 that are generally opposite each other. When the support member 1120 is so attached to the base member 1111, the connecting section 1123 may interface with a lower section 1116 of the base member 1111 so as to provide sufficient support when a food item is interfaced with and being supported by the interfacing surfaces 1122, and the attachment members 1124 may prevent lateral movement of the support members 1120 relative to the base member 1111.

Additionally, the support members 1120 may further comprise extension sections 1127. The extension sections 1127 may be outcroppings extending from the intermediate sections 1121 that are configured to cooperate with a structure of the base member 1111 so as to removably attach the storage members 1120 to the base member 1111 in a second orientation, as described hereinabove and shown in FIG. 12. In the present embodiment, the extension sections 1127 are spaced apart so as to be positionable within two recesses 1112 comprised by one of the ridges 1113 of the base member 1111. In this manner, two support members 1120 may be attached to respective ridges 1113', 1113" of the base member 1111.

Figure 13:
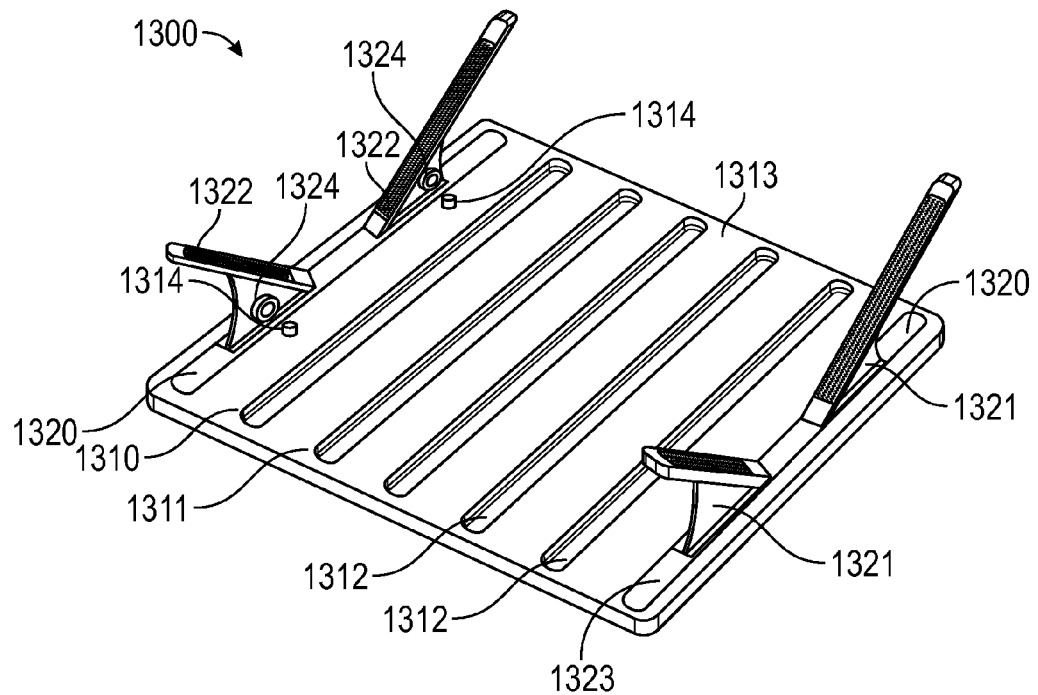
FIG. 13 is a perspective view of an adjustable food support according to an embodiment of the invention.
Figure 14:
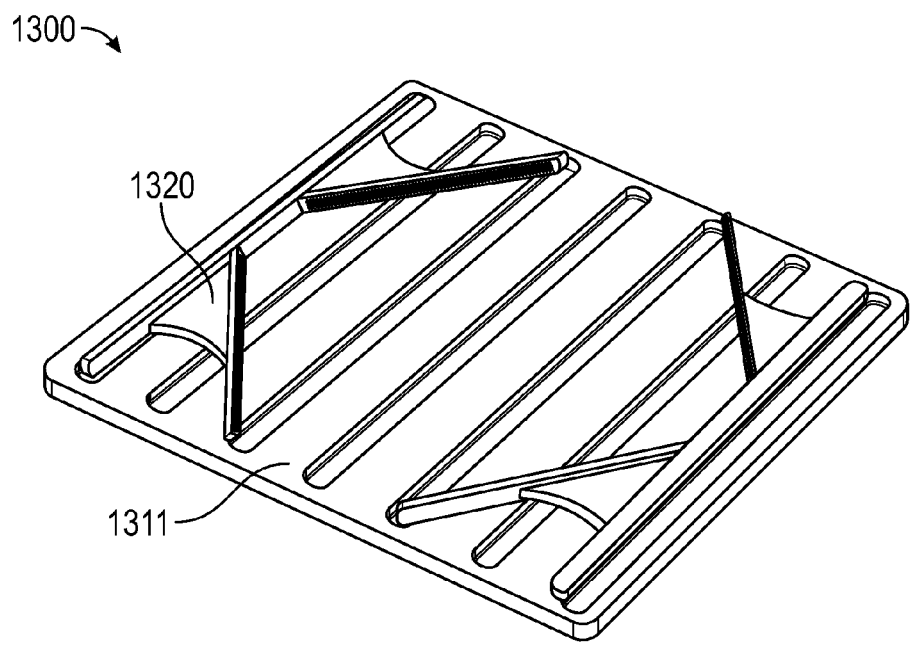
FIG. 14 is a perspective view of the adjustable food support of FIG. 13 including two support members in a storage attachment configuration.

Referring now to FIGS. 13-14, an adjustable food support 1300 according to an embodiment of the invention is presented. The adjustable food support 1300 comprises a stabilizing member 1310 in the form of a base member 1311 comprising a support receiving section in the form of a plurality of extended recesses 1312 formed in an upper surface 1313 of the base member 1311. The extended recesses 1312 may extend substantially from one end of the base member 1311 to an opposite end. Additionally, the extended recesses 1312 may be spaced apart as described hereinabove. The adjustable food support 1300 may further comprise a plurality of support members 1320, each support member 1320 comprising opposing interfacing surfaces 1321, opposing interfacing surfaces 1322, and a connecting section 1323 attached to the opposing intermediate sections 1321.

The connecting section 1323 may be configured to cooperate with a structure of the base member 1311 so as to removably attach the support member 1320 to the base member 1311. More specifically, the support members 1320 may be removably attachable to the base member 1311 in a first configuration by positioning the connecting section 1323 within one of the extended recesses 1312 of the base member 1311. The positioning of the connecting section 1323 within an extended recess 1312 may prevent the support member 1320 from moving with respect to the base member 1311.

Additionally, the support members 1320 may further comprise an attachment section 1324 configured to cooperate with a structure of the base member 1311 so as to removably attach the support member 1320 thereto in a second configuration, as described hereinabove. Specifically, the support members 1320 may comprise two attachment sections 1324 extending from the intermediate sections 1321 that are configured to receive an attachment outcropping 1314 extending upwardly from the upper surface 1313 of the base member 1311, thereby establishing a removable attachment therebetween, as can be seen in FIG. 14.

Figure 15:
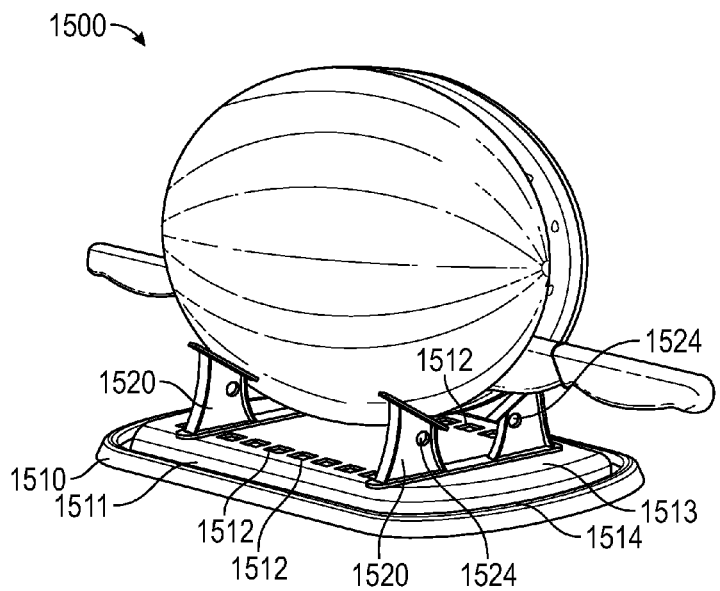
FIG. 15 is an environmental perspective view of an adjustable food support according to an embodiment of the invention supporting a food item.
Figure 16:
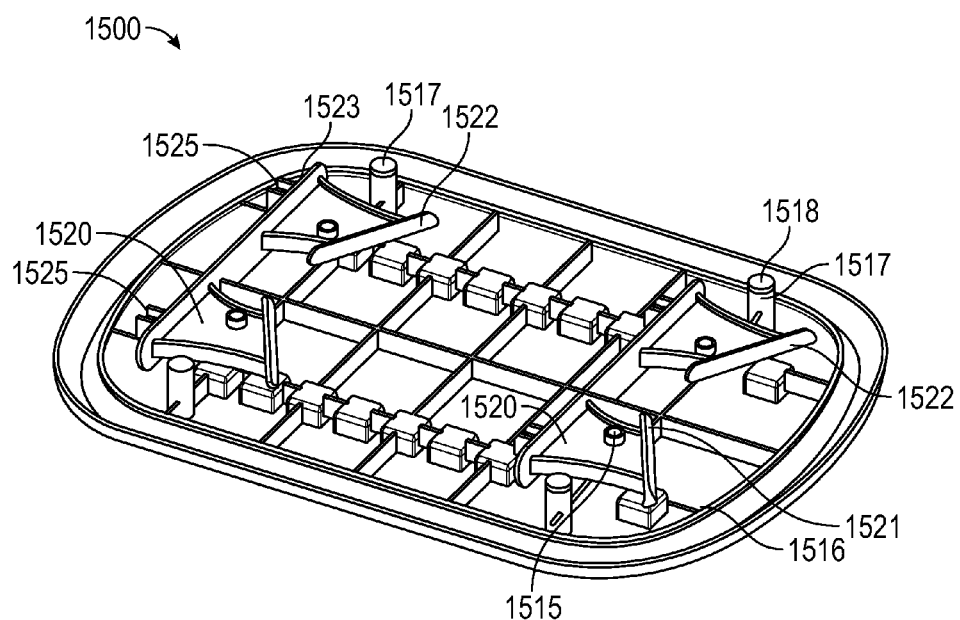
FIG. 16 is a lower perspective view of the adjustable food support of FIG. 15 in a storage attachment configuration.

Referring now to FIGS. 15-16, an adjustable food support 1500 according to another embodiment of the invention is presented. The adjustable food support 1500 may comprise a stabilizing member 1510 in the form of a base member 1511 that comprises a support receiving section in the form of a plurality of recesses 1512 formed in an upper surface 1513 of the base member 1511 in an arrangement of two parallel lines of recesses. The plurality of recesses 1512 may be configured to facilitate the removable attachment of support members 1520 of the adjustable food support 1500 in a first configuration by permitting the positioning therewithin a structure of the support member 1520. Furthermore, in the present embodiment, the plurality of recesses 1512 have a generally square geometry. Additionally, the base member 1511 may comprise an outer recess 1514 formed in the upper surface 1513 that is adjacent to an outer edge of the upper surface 1513 and generally circumscribes the plurality of recesses 1512.

The support members 1520 may comprise intermediate sections 1521, interfacing surfaces 1522, a connecting section 1523 connected to the intermediate sections 1521, and attachment members 1525 extending generally downward from the connecting section 1523, being configured to cooperate with the plurality of recesses 1512 so as to removably attach the support member 1520 to the base member 1511 in the first configuration. Additionally, the support members 1520 may comprise apertures 1524 formed in the intermediate section 1521 and configured to cooperate with a structure of the base member 1511 to removably attach the support member 1520 to the base member 1511 in a second configuration, as described hereinabove. More specifically, the apertures 1524 may be configured to permit outcroppings 1515 extending from a lower section 1516 of the base member 1511 to pass therethrough, thereby attaching the support member 1520 to an underside of the base member 1511. Additionally, the base member 1511 may comprise a plurality of leg members 1517 configured to extend downward from the lower section 1516 of the base member 1511. In some embodiments, the leg members 1517 may extend a distance downward from the lower section 1516 that is greater than a distance the support members 1520 extend downward from the lower section 1516 when attached in the second configuration. Additionally, each leg member 1517 may comprise a foot 1518 configured to prevent motion of the base member 1511 relative to a surface the base member 1511 is positioned upon, as described hereinabove.

Figure 17:
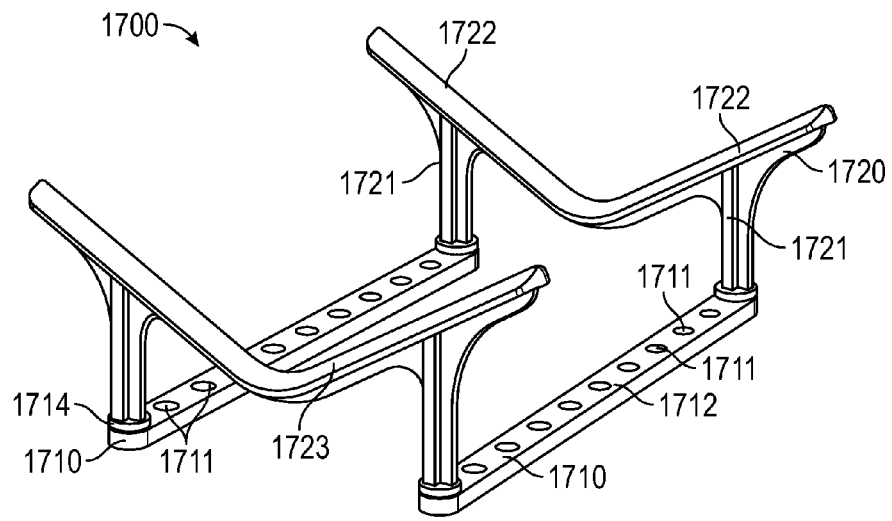
FIG. 17 is a perspective view of an adjustable food support according to an embodiment of the invention.

Referring now to FIG. 17, an adjustable food support 1700 according to another embodiment of the invention is presented. The adjustable food support 1700 comprises a stabilizing member in the form of a plurality of extended base members 1710, each extended base member 1710 comprising a support receiving section in the form of a plurality of recesses 1711 formed in an upper surface 1712 of each extended base member 1710. The plurality of recesses 1711 may be configured to cooperate with a structure of a support member 1720 of the adjustable food support 1700 so as to removably attach the support member 1720 to the extended base member 1710. Furthermore, the plurality of extended base members 1710 may be repositionable from at least one other extended base member 1710. In other words, at least two of the plurality of extended base members 1710 may be discrete and unattached structures. In some embodiments, the plurality of recesses 1711 of one extended base member 1710 may be formed so as to be spaced apart equally and at a distance that is equal to the spacing of the plurality of recesses 1711 of another extended base member 1710. In another embodiment, the plurality of recesses 1711 may be spaced unequally respective to one another, or respective to the spacing of recesses 1711 of another extended base member 1710.

In the present embodiment, a pair of extended base members 1710 is depicted. It is contemplated and included within the scope of the invention that the adjustable food support 1700 may include any number of extended base members 1710. Moreover, while the extended base members 1710 are presented in a generally parallel orientation, any orientation is contemplated and included within the scope of the invention, including, but not limited to, square, triangular, rectangular, or any other polygonal configuration.

The support members 1720 may comprise intermediate sections 1721, interfacing surfaces 1722, and a connecting section 1723 connected to the interfacing surfaces 1722. In some embodiments, the connecting section 1723 is integrally formed with the interfacing surfaces 1722. Furthermore, the support members 1720 may comprise an attachment section 1724 extending downward from a lower section of the intermediate section 1721 and is configured to be positioned within the a recess 1711 of an extended base member 1710 so as to removably attach the support member 1720 to the extended base member 1710. Furthermore, the support members 1720 may be configured to removably attach to at least two extended base members 1710 simultaneously.

While the present embodiment of the adjustable food support 1700 depicts two support members 1720 connected to a common pair of extended base members 1710, it is contemplated and included within the scope of the invention that a given pair of support members 1720 comprised by the adjustable food support 1700 may be simultaneously attached to one or no common extended base members 1710.

Figure 18:
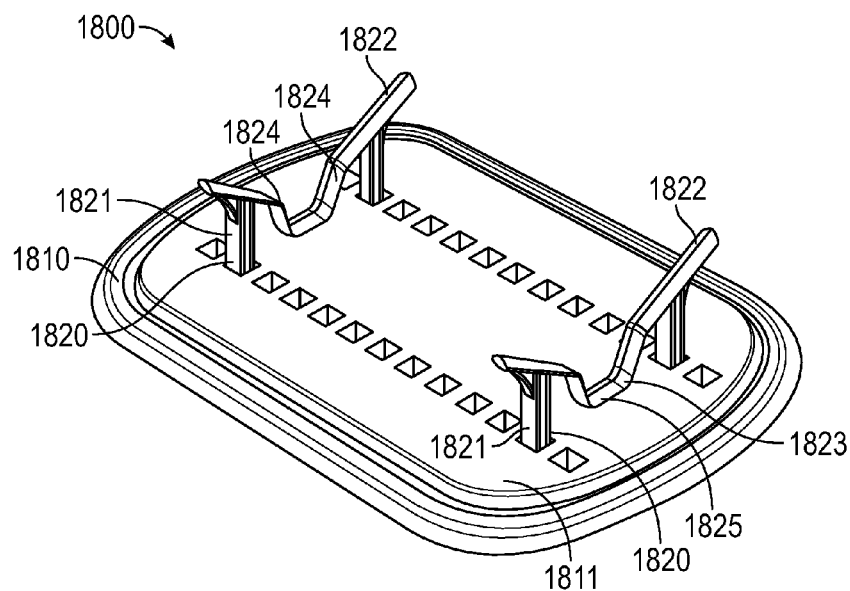
FIG. 18 is a perspective view of an adjustable food support according to an embodiment of the invention.

Referring now to FIG. 18, an adjustable food support 1800 according to another embodiment of the invention is presented. The adjustable food support 1800 may comprise a stabilizing member in the form of a base member 1810 that is substantially similar to the base member 1511 of the embodiment depicted in FIGS. 15-16. The adjustable food support 1800 may further comprise a plurality of support members 1820, each comprising intermediate sections 1821, interfacing surfaces 1822, and a connecting section 1823 connecting the interfacing surfaces 1822. In the present embodiment, the connecting section 1823 may comprise one or more offsetting sections 1824 and an interconnecting section 1825 positioned between and connecting the offsetting sections 1824. The offsetting sections 1824 may be attached at one end to a lower section of an interfacing surface 1822 and at another end to an end of the interconnecting section 1825. Furthermore, the offsetting sections 1824 may extend at a significant downward angle, or generally downward, from the lower section of the interfacing surface 1822. Additionally, the interconnecting section 1825 may be generally horizontal, and may either interface with or be positioned slightly above an upper surface 1811 of the base member 1810. Such a configuration of the connecting section 1823 may facilitate cutting entirely through a portion of a food item that is immediately adjacent to the connecting section 1823.

Figure 19:
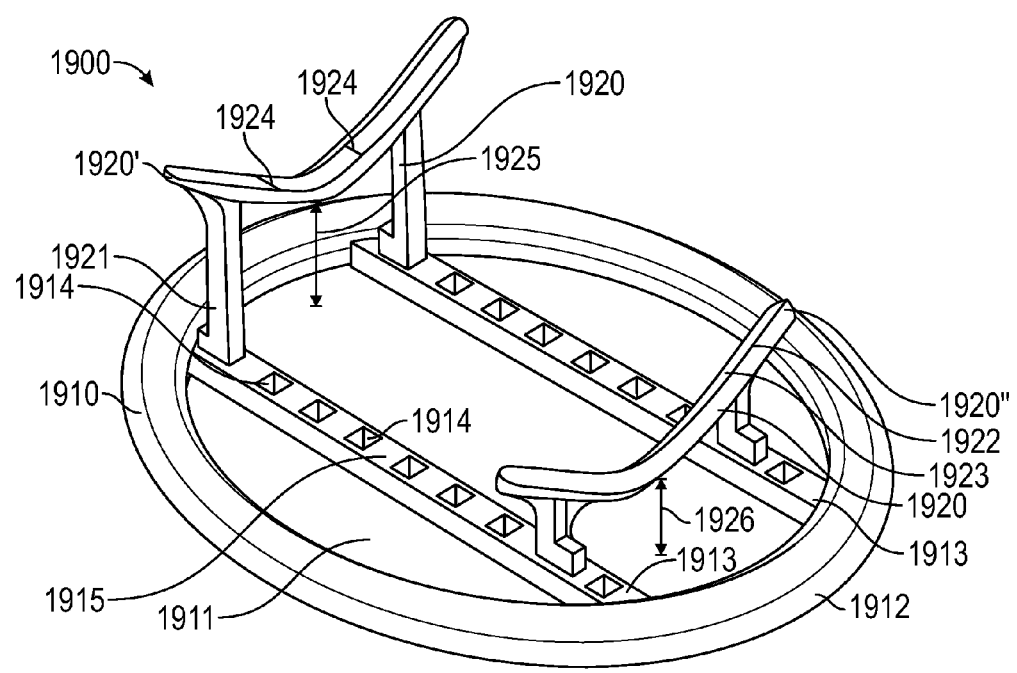
FIG. 19 is a perspective view of an adjustable food support according to an embodiment of the invention.

Referring now to FIG. 19, an adjustable food support 1900 according to another embodiment of the invention is presented. The adjustable food support 1900 comprises a stabilizing member in the form of a base member 1910 and a plurality of support members 1920. The base member 1910 may have a generally elliptical configuration. Additionally, the base member 1910 may comprise a lower section 1911, a wall 1912 extending generally upward from the lower section 1911 about the periphery of the lower section 1911, and a support receiving section in the form of a plurality of raised sections 1913, each raised section 1913 comprising a plurality of recesses 1914 formed in an upper surface 1915 of the raised section 1913. The plurality of recesses 1914 may be configured to cooperate with a structure of the support members 1920 to facilitate the removable attachment of the support members 1920 to the base member 1910.

The support members 1920 may comprise intermediate sections 1921, interfacing surfaces 1922, and a connecting section 1923 connected to a lower end 1924 of the interfacing surfaces 1922. A first support member 1920' may be configured to have a first height 1925 relative to the lower section 1911 and a second support member 1920" may be configured to have a second height 1926 relative to the lower section 1911. Moreover, the first height 1925 may be greater than the second height 1926. More specifically, the first support member 1920' may be configured such that a distance between the lower end 1924 of the interfacing surfaces 1922 thereof may be at the first height 1925 relative to the lower section 1911, and the second support member 1920" may be configured such that a distance between the lower end 1924 of the interfacing surfaces 1922 thereof may be at the second height 1926 relative to the lower section 1911. Any configuration of the structure of the support member 1920 that may accomplish this differentiation of heights between support members 1920 is contemplated and included within the scope of the invention, including, but not limited to, configuration of the intermediate section, such as the distance the intermediate section extends from either a connecting section or a base member, configuration of a connecting section, such as a height or thickness thereof, or configuration of the interfacing surfaces, such as an angle of inclination thereof, a length thereof, or a thickness thereof.

Figure 20:
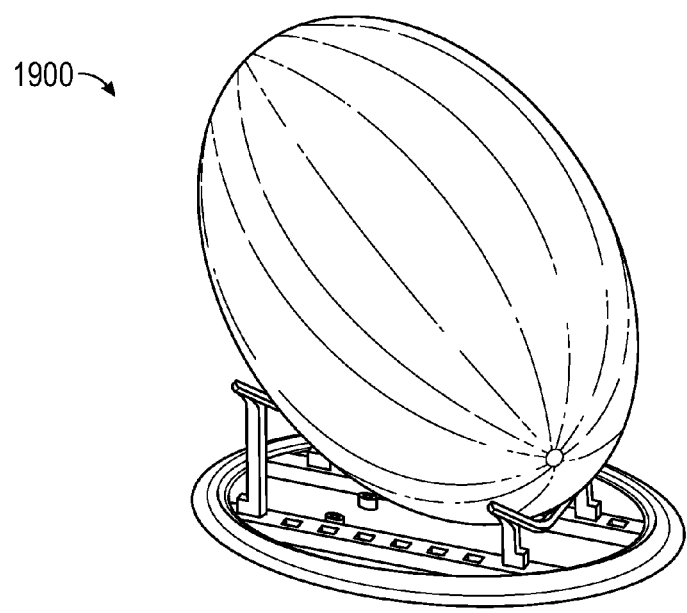
FIG. 20 is an environmental perspective view of the adjustable food support of FIG. 19 supporting a food item.

Use of support members 1920 of the present embodiment may enable a user to support a food item at an orientation, as shown in FIG. 20, which is different from the orientation of a food item as shown in FIGS. 9 and 15.

Figure 21:
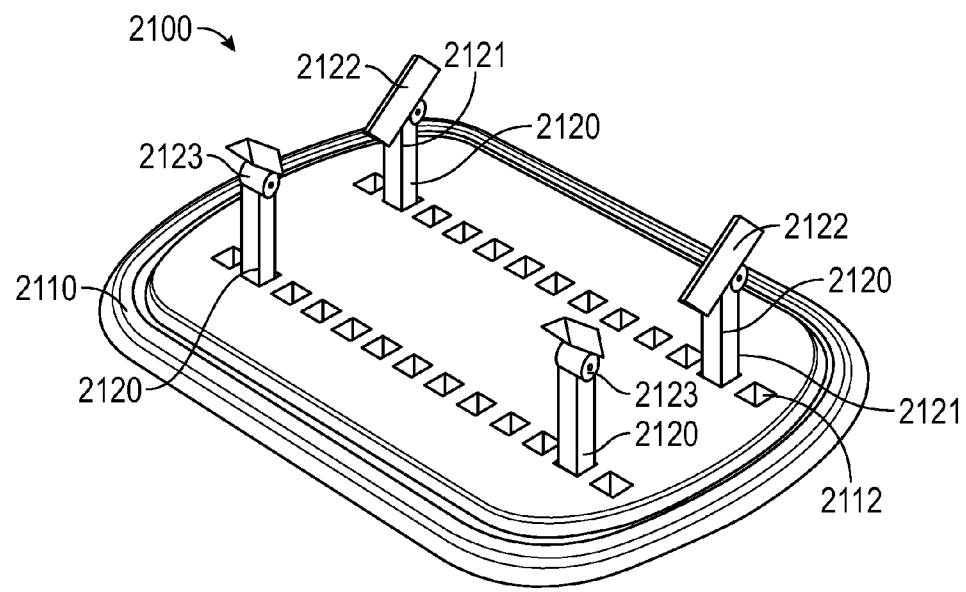
FIG. 21 is a perspective view of an adjustable food support according to an embodiment of the invention.

Referring now to FIG. 21, an adjustable food support 2100 according to another embodiment of the invention is presented. The adjustable food support 2100 comprises a stabilizing section in the form of a base member 2110 that is substantially similar to the base members 1810, 1910 of the embodiments depicted in FIGS. 18 and 19, respectively. Specifically, the base member 2110 comprises a plurality of recesses 2112 configured to receive the support members 2120 of the adjustable food support 2100.

The support members 2120 may comprise a single intermediate section 2121 and a single interfacing surface 2122. In this embodiment, each support member 2120 may be attachable to the base member 2110 so as to have an opposing support member 2120, or such that there is no opposing support member 2120 directly opposite. While the present embodiment depicts four support members 2120, any number of support members 2120 is contemplated and included within the scope of the invention.

Additionally, the support members 2120 may comprise a rotation member 2123. The rotation member 2123 may be configured to permit the interfacing surface 2122 to rotate with respect to at least one of the intermediate section 2121 and the base member 2110. In the present embodiment, the rotation member 2123 is positioned intermediate the interfacing surface 2122 and the intermediate section 2121, thereby connect the interfacing surface 2122 and the intermediate section 2121 and enabling the interfacing surface 2122 to rotate with respect to the intermediate section 2121. Such a rotation member 2123 may be included in any embodiment of the invention. The rotation member 2123 may be any type of structure that may enable rotation as described hereinabove as is known in the art, including, but not limited to, hinge joints, plane joints, ball-and-socket joints, knuckle joints, pin joints, and the like.

Figure 22:
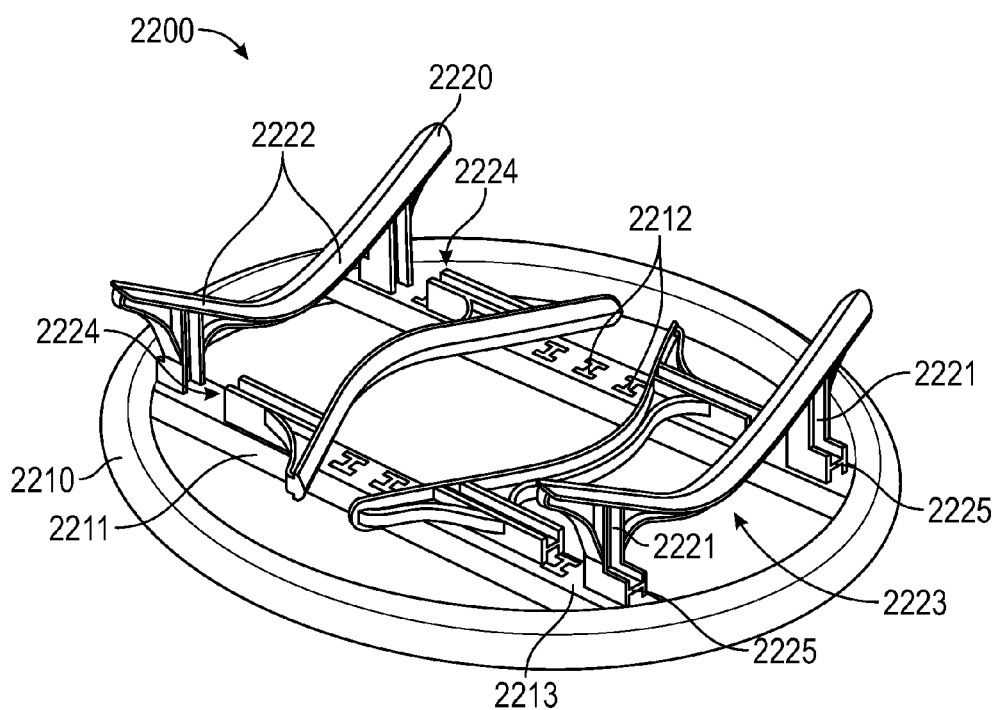
FIG. 22 is a perspective view of an adjustable food support according to an embodiment of the invention.

Referring now to FIG. 22, an adjustable food support 2200 according to another embodiment of the invention is presented. The adjustable food support 2200 may comprise a stabilizing member in the form of a base member 2210 that is substantially similar to the base member 1910 of the embodiment depicted in FIG. 19. Specifically, the base member 2210 may comprise a support receiving section in the form of a plurality of raised sections 2211, each raised section 2211 comprising a plurality of recesses 2212 formed in an upper surface 2213 of the raised section 2211.

The adjustable food support 2200 may further comprise a plurality of support members 2220 comprising intermediate sections 2221, interfacing surfaces 2222, and a connecting section 2223. A lower section 2224 of the intermediate sections 2221 may be configured to cooperate with the plurality of recesses 2212 so as to removably attach the support member 2220 in a first configuration. Additionally, the support member 2220 may further comprise one or more extension sections 2225 configured to cooperate with the plurality of recesses 2212 so as to removably attach the support member 2220 in a second configuration. The extension sections 2225 may extend generally outwardly from the intermediate section 2221.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. An adjustable food support comprising:
   a base member comprising:
      a lower section; and
      a support receiving section; and
   a plurality of support members, each support member comprising:
      two opposing intermediate sections,
      a first interfacing surface and a second interfacing surface opposing the first interfacing surface, each being located at an upper section of a respective intermediate section, and
      a connecting section connecting at least one of the intermediate sections and the interfacing surfaces;
   wherein the first interfacing surfaces of the plurality of support members define a first plane, the second interfacing surfaces of the plurality of support members define a second plane;

wherein the first plane and the second plane intersect above the stabilizing member;

wherein a longitudinal axis of each interfacing surface is skew to a longitudinal axis of the opposing interfacing surface, defining an angle therebetween within the range from 60 degrees to 160 degrees;

wherein a support member plane is defined by the longitudinal axes of the opposing interfacing surfaces of the support member;

wherein the support member plane of one support member of the plurality of support members is positionable so as to be generally parallel to the support member plane of another support member of the plurality of support members; and wherein the connecting section is configured to be attachable to the support receiving section in a first configuration comprising a first orientation such that the intermediate section extends generally upward from the lower section and is attachable to the support receiving section in a second configuration comprising a second orientation such that the intermediate section extends to generally parallel to a plane defined by the lower section.

2. The adjustable food support of claim 1 wherein the stabilizing member is configured to extend from the connecting section of the support member.

3. The adjustable food support of claim 1 wherein:
each interfacing surface comprises a lower section; and
a blade clearance is defined between the lower sections of opposing interfacing surfaces.

4. The adjustable food support of claim 3 wherein the blade clearance is within the range from ⅛ inch to 4 inches.

5. The adjustable food support of claim 1 wherein the connecting sections define a longitudinal axis that is parallel to a plane defined by the lower section of the base member; and wherein the base member is configured to permit at least two support members of the plurality of support members to be attached thereto simultaneously such that the longitudinal axes of the connecting sections of the attached support members are parallel.

6. The adjustable food support of claim 5 wherein:
simultaneous attachment of two support members to the base member defines a separation distance therebetween; and
the base member is configured to permit the support members to be attached thereto so as to define a separation distance of at least 1 inch.

7. The adjustable food support of claim 1 wherein:
the base member further comprises an edge section extending upwardly fro he lower section about the periphery of the lower section;
the support receiving section comprises a plurality of retaining members extending upwardly from the lower section and inwardly from the edge section; and
the connecting section is configured to be positioned between adjacent retaining members so as to removably attach the support member to the base member.

8. The adjustable food support of claim 1 wherein:
a lower end of the interfacing surfaces of a first support member of the plurality of support members is at a first distance above the stabilizing member;
a lower end of the interfacing surfaces of a second support member of the plurality of support members is at a second distance above the stabilizing member; and
the first distance is greater than the second distance.

9. The adjustable food support of claim 1 wherein the intermediate sections further comprise a rotation member configured to permit the interfacing surfaces to be rotated relative to the respective intermediate sections.

10. An adjustable food support comprising:
a base member comprising:
a lower section,
an edge section extending upwardly from the lower section about the periphery of the lower section, and
a support receiving section comprised by the lower section comprising a plurality of retaining members extending upwardly from the lower section and inwardly from the edge section: and
a first support member and a second support member, each comprising:
a connecting section configured to be removably attachable to the support receiving section of the base member,
a first intermediate section proximate to a first end of the support member,
a second intermediate section proximate to a second end of the support member,
a first interfacing surface located on an upper surface of the first intermediate section, and
a second interfacing surface located on an upper surface of the second intermediate section;
wherein longitudinal axes of each of the interfacing surfaces are skew to a plane defined by the lower section, defining an angle therebetween within the range from 60 degrees to 160 degrees;
wherein the base member is configured to permit a support member of the plurality of support members to be attached thereto in a first configuration such that the adjustable food support has a first height and in a second configuration such that the adjustable food support has a second height; and wherein the first height is greater than the second height;
wherein a support member plane is defined by the longitudinal axes of he opposing interfacing surfaces of the support member
wherein the support member plane of one support member of the plurality of support members is positionable so as to be generally parallel to the support member plane of another support member of the plurality of support members; and
wherein the connecting section is configured to be position between adjacent retaining members so as to removably attach the support member to the base member.

11. The adjustable food support of claim 10 wherein the attachment of the first and second support members to the base member defines a separation distance therebetween of at least 1 inch.

12. An adjustable food support comprising:
a base member comprising:
a lower section,
an edge section extending upwardly from the lower section about the periphery of the lower section, and
a receiving section comprising by the lower section and comprising a plurality of retaining members extending upwardly from the lower section and inwardly from the edge section; and
a plurality of support members comprising:
a connecting section configured to be positioned between pairs of adjacent retaining members on opposite sides of the base member so as to removably attach the support member to the base member,
a first intermediate section proximate to a first end of the support member, a second intermediate section proximate to a second end of the support member, a first interfacing surface located on an upper surface of the first intermediate section, and a second interfacing surface located on an upper surface of the second intermediate section;

wherein longitudinal axes of each of the interfacing surfaces are skew to a plane defined by the lower section;

wherein the first interfacing surfaces of each of the first and second support members define a first plane;

wherein the second interfacing surfaces of each of the first and second support members define a second plane; and wherein the first plane and the second plane intersect at a point above the base member to define a line that is parallel to a centerline of each of the first and second support members;

wherein the connecting section is configured to be positioned between adjacent retaining members in a first orientation such that the intermediate section extends generally upward from the lower surface and in a second orientation such that the intermediate section extends generally parallel to a plane defined by the lower surface;

wherein the adjustable food support has a first height when the support member is attached to the receiving section in the first orientation and a second height when the support member is attached to the receiving section in the second orientation;

wherein the first height is greater than the second height;

wherein the base member is configured to permit a support member of the plurality of support members to be attached thereto in a first configuration such that the adjustable food support has a first height and in a second configuration such that the adjustable food support has a second height; and wherein the first height is greater than the second height;

wherein each of the first interfacing surface and the second interfacing surface comprise a lower end;

wherein a blade clearance area is defined between the lower ends of each of the first interfacing surface and the second interfacing surface; and wherein the blade clearance area is within the range from ⅛ inch to 4 inches.

\* \* \* \* \*